United States Patent

Scarnato et al.

[15] 3,637,237
[45] Jan. 25, 1972

[54] TIRE BUMPER FOR TRAILER TONGUE

[72] Inventors: Thomas J. Scarnato, Barrington; James R. Adams, Downers Grove; Arthur H. Keller, Western Springs; Peter J. Peacock, Western Springs, all of Ill.

[73] Assignee: International Harvester Company, Chicago, Ill.

[22] Filed: Feb. 5, 1970

[21] Appl. No.: 9,024

[52] U.S. Cl. ............................................ 280/462, 280/446
[51] Int. Cl. ............................................................ B60d 1/00
[58] Field of Search ................. 280/400, 457, 462, 467, 474; 293/58, 62, 72

[56] References Cited

UNITED STATES PATENTS

| | | | |
|---|---|---|---|
| 2,609,214 | 9/1952 | Vos | 280/495 |
| 3,322,916 | 5/1967 | Fisher | 293/72 X |

FOREIGN PATENTS OR APPLICATIONS

| | | | |
|---|---|---|---|
| 901,988 | 1/1954 | Germany | 280/432 |

Primary Examiner—Leo Friaglia
Attorney—Floyd B. Harman

[57] ABSTRACT

A tire bumper for mounting on a tongue member of a pull-type harvester or implement to prevent the rear wheel tires from engaging the power shaft structure carried on the tongue. The bumper is one piece in one embodiment with a rectangular center section fitting on a complemental tongue and removably clamped thereto for longitudinal adjustment thereon in alignment with the arc of travel of the wheel. In another embodiment reversely arranged identical pieces are bolted about the tongue. Each piece or end of the one piece construction is of apical form to provide diagonal surface areas to the tire so that it will slide against the bumper without tearing up the parts.

8 Claims, 4 Drawing Figures

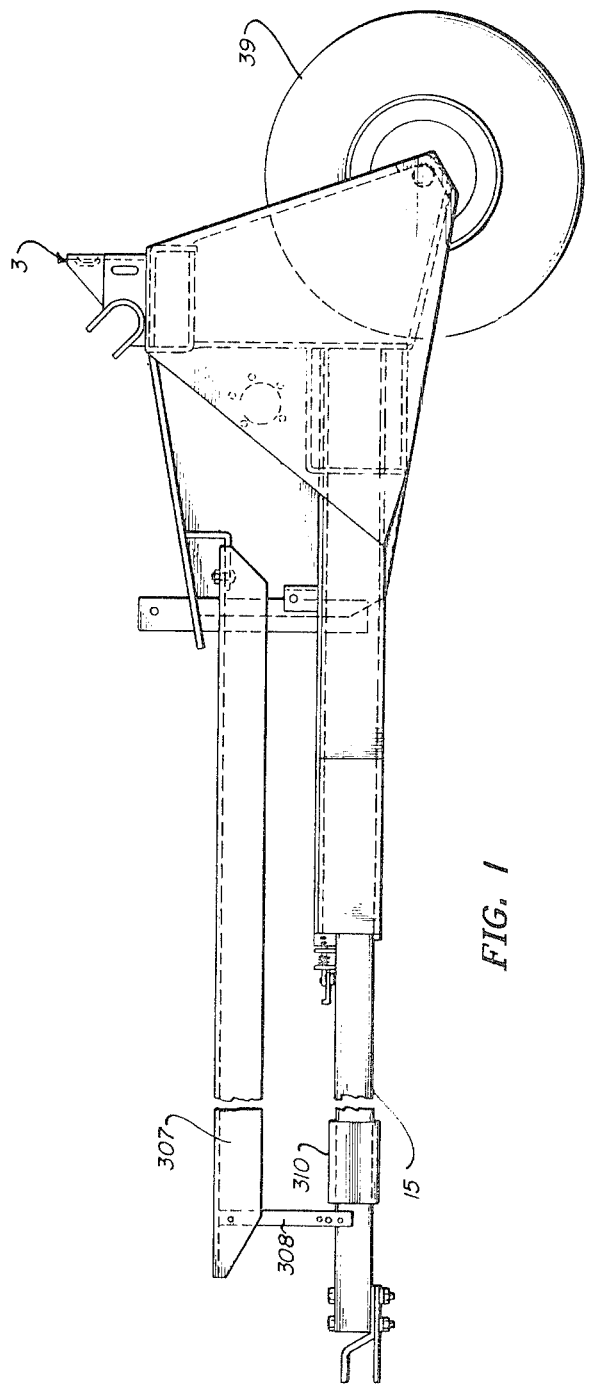

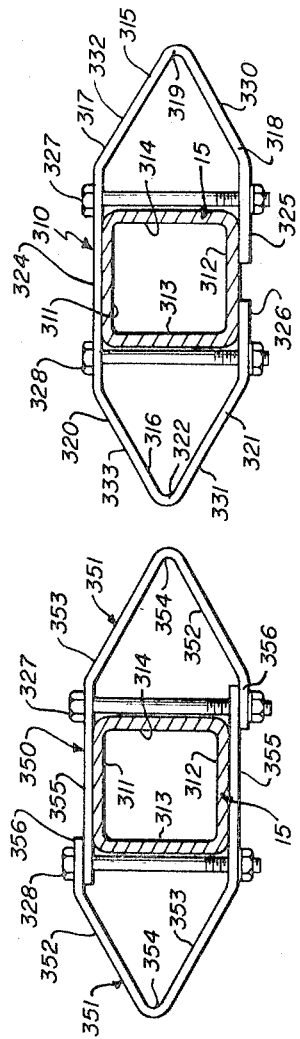
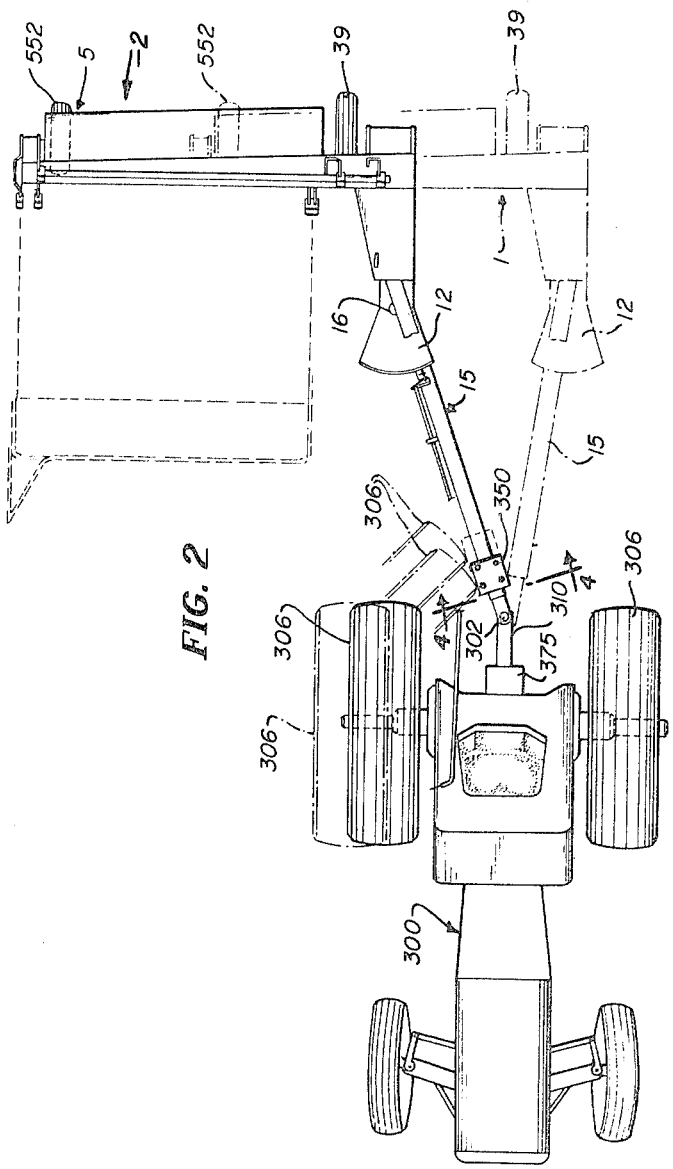

TIRE BUMPER FOR TRAILER TONGUE

DISCUSSION OF THE PRIOR ART

At present there are no bumpers provided on the tongue of an implement to prevent damage as heretofore indicated the tractor turns relative to the tongue beyond a critical angle and there are no bumpers which have apical ends to facilitate the tractor tire to slide thereon without hanging up.

SUMMARY OF THE INVENTION

This invention is directed to a tire bumper for mounting on the tongue of an implement.

A general object is to provide a bumper of simple, rugged construction which may be readily adjustable to position the same in alignment with the wheels of such tractor.

A more specific object is to provide a bumper wherein the end portions have upper surfaces sloping downwardly toward the respective ends of the bumper and lower surfaces inclined upwardly toward the respective ends of the bumper so that the wheel will be presented a sloping surface in either direction of rotation of the wheel.

A further object in one embodiment is to provide a two part bumper structure wherein the parts are of identical construction telescoped endwise and tied together by the same means which secures them to the tongue.

A still further object is to provide a bumper which has ends projecting beyond opposite sides of the tongue and wherein the ends present minimal surface areas for engagement with the wheels.

These and other objects and advantages inherent in the invention will become more apparent from the specification and the drawings wherein:

FIG. 1 is a side elevational view of the framework with the bumpers mounted thereon;

FIG. 2 is a plan view of the harvester with part of the structure shown in phantom lines and illustrating the connection of the unit to a tractor;

FIG. 3 is an enlarged sectional view of one form of bumper guard taken substantially on the line 3—3 of FIG. 2;

FIG. 4 is a view comparable to FIG. 3 showing a modification of the bumper guard structure;

The invention is described with a pull-behind implement 2 such as a mower conditioner harvesting unit having a laterally offset tongue 15 connected to framework 5 carried on wheels 39 and 552. The tongue or draft bar 15 is laterally adjustable in a fore and aft extending frame portion 12 and maintained in adjusted position by a pin 16.

The position of the harvesting unit in relation to the operating tractor generally designated 300 is shown in FIG. 2. The tractor is pivotally connected at 302 to the forward end of a tongue 15 as best seen in FIG. 1. A vertical pivot is established at 302 wherein lateral pivotal movement is obtained between the tongue and the tractor for steering purposes. It has been found that if such steering movement is beyond a predetermined extent, the rear wheels 306 will engage with and crush or destroy the power takeoff shield 307 (FIG. 1) which is supported by the straps 308 in normal manner from the tongue and by means of support 42 from the side frame element 40. In order to safeguard against this occurrence a novel bumper guard designated 310 (FIGS. 3 and 4) is provided on the tongue 15 which is of box section having top and bottom walls 311 and 312 and sidewalls 313 and 314. The bumper guard as shown in FIG. 3 is fusiform in cross section and comprises a pair of apical bumper structures 315 and 316 at opposite ends and that is at opposite sides of the tongue. The structure 315 comprises outwardly converging top and bottom webs 317 and 318 which merge into an apex 319 and the structure 316 is provided with outwardly converging top and bottom webs 320 and 321 which merge into an apex 322 and the apices 319 and 322 are spaced at substantial distance from the walls 314 and 313. The walls 317 and 320 merge into a top wall 324 of the body portion of the unit and the webs 318 and 321 merge into the lower horizontal webs 325 and 326. The top wall 324 seats on top of the wall 311 of the tongue and the bottom webs 325 and 326 engage the underside of the bottom wall 312. The unit is clamped to the tongue by means of a pair of bolt and nut assemblies 327 and 328. The nut and bolt assembly 327 is spaced closely to the web 314 and interconnects the walls 324, 325 and tightens them against the top and bottom sides of the tongue. Similarly the bolt 328 which is closely spaced to the web 313 of the tongue interconnects the top and bottom portions 324, 326. The placement of these bolts 327 and 328 close to the exterior sides of the webs 314 and 313, serves as means to prevent shifting of the bumper guard unit 310 transversely of the tongue. At the same time by loosening the bolts the bumper guard may be shifted longitudinally of the tongue in accordance with the position where the tire or the wheel would normally swing or in accordance with its arc of swing which is dependent upon the position of the wheels from the axle. These wheels are either adjustable on the tractor axle. The adjustment of the bumper lengthwise of the tongue also accommodates different tractors and their particular wheel spacings. Thus a novel bumper guard is provided with novel apical ends which prevent the lugs of the tires from hanging up on the guard. As the tractor is moving forwardly the wheel will slide on the diagonal under surface 330 of the web 318 or 331 of the web 321 and if the tractor wheel is moving rearwardly it will slide over the upper surface 332 of web 317 or 333 of web 320 depending on the turn or the turning movement of the tractor. The relationship of the wheels with respect to the bumper guard is adequately shown in FIG. 2 wherein it will be seen that the guard 310 will be positioned in one position with the wheel shown in solid lines and in another position rearwardly with the wheels extended or if a different tractor with different wheel spacings is used.

A bumper guard generally designated 350 of modified construction is shown in FIG. 4 wherein it will be seen that the right and left-hand parts designated 351, 351 are of identical construction but are turned upside down with respect to one another. Each section 351 comprises a pair of outwardly converging webs 352, 353 which merge into apices 354. The web 353 extended into an obtusely arranged mounting portion or plate 355 and web 354 is similarly extended into a short width mounting extension or projection 356. Thus it will be seen in FIG. 25 that the two sections 351 are telescoped one within the other and as seen in FIG. 25 the rightward section 351 has the web 355 overlying the wall 311 and is underposed with respect to the extension 356 of the leftward member 351 and that the leftward member has its wall section 355 underposed with respect to the bottom wall 312 of the tongue and overlies the extension 356 of the element 351. In each instance the bolts 328 and 327 interconnect the portions 356 and 355 to each other and clamp the portions 355 against the top and bottom walls 311 and 312 of the tongue 15.

Having described the novel harvesting unit various inventions are apparent and this application is concerned with inventions hereinafter claimed.

We claim:

1. For use on an implement-pulling tongue pivotally connected to a tractor having wheels which upon turning of the tractor beyond a predetermined angle destructively engages the tongue and parts thereon, a bumper guard having a center section forming means for mounting on the tongue and apical end portions projecting endwise from said center section in position for engagement by said wheels during excessive turning movements of the tractor, wherein said center section comprises a web interconnecting said end portions and providing a mounting for said guard, and web means on each end portions extending toward the other end portion and spaced transversely of the web and forming a clamp structure therewith for receiving the tongue therebetween, and bolt and nut assemblies extending through said web and respective web means and spaced on the order of the width of the associated tongue for lateral engagement therewith and serving to draw the web and web means against the intervening tongue.

2. For use on an implement-pulling tongue pivotally connected to a tractor having wheels which upon turning of the tractor beyond a predetermined angle destructively engages the tongue and parts thereon, a bumper guard having a center section forming means for mounting on the tongue and apical end portions projecting endwise from said center section in position for engagement by said wheels during excessive turning movements of the tractor, wherein said bumper guard is formed of two identical parts, each portion comprising an outer apical section and the inner center section comprising a plate and a flange extending from the apical section, the flange and plate arranged in transversely spaced parallel relationship, the said web and flange of each part intercollating with the flange and web of the other part to form said center section.

3. For use on an implement-pulling tongue pivotally connected to a tractor having wheels which upon turning of the tractor beyond a predetermined angle destructively engages the tongue and parts thereon, a bumper guard having a center section forming means for mounting on the tongue and apical end portions projecting endwise from said center section in position for engagement by said wheels during excessive turning movements of the tractor, and said guard formed of one piece comprising a horizontally oriented plate interconnecting said end portions along their upper edges, each end portion comprising an upper wall sloping downwardly and outwardly from the top plate and a bottom wall having an outer edge merging into an apex with the outer edge of the related upper wall and sloping inwardly downwardly therefrom, and a flange extending inwardly from the inner edge of the bottom wall parallel with the top plate and spaced vertically therefrom, and said plate having bolt-receiving apertures at its ends in vertical alignment with apertures in the respective flanges.

4. For use on an implement-pulling tongue pivotally connected to a tractor having wheels which upon turning of the tractor beyond a predetermined angle destructively engages the tongue and parts thereon, a bumper guard having a center section forming means for mounting on the tongue and apical end sections projecting endwise from said center section in position for engagement by said wheels during excessive turning movements of the tractor, and said guard formed of two identical reversely arranged parts having intercollated means forming said center section.

5. The invention according to claim 4 and each part comprising a V-shaped end section having a pair of walls interconnected at one of their edges, and a flat plate connected to the free edge of one of the walls, and a flange connected to the other of the walls and disposed parallel with said plate.

6. The invention according to claim 4 and each part comprising a pair of substantially parallel flat laterally spaced plates, one shorter than the other and V-section end sections projecting outwardly therefrom comprising a pair of converging walls connected at one of their ends to respective plates and connected to each other at their other ends.

7. For use on an implement-pulling tongue pivotally connected to a tractor having wheels which upon turning of the tractor beyond a predetermined angle destructively engages the tongue and parts thereon, a bumper guard having a center section forming means for mounting on the tongue and apical end sections projecting endwise from said center section in position for engagement by said wheels during excessive turning movements of the tractor, and said end sections being aligned horizontally, and said center section comprising a continuous upper wall interconnecting said sections and a discontinuous lower wall structure having portions connected to respective end sections.

8. The invention according to claim 7 and said guard being bilaterally symmetrical.

* * * * *